US009850965B2

(12) United States Patent
Khafagy et al.

(10) Patent No.: US 9,850,965 B2
(45) Date of Patent: Dec. 26, 2017

(54) METHOD FOR OPERATING AN AUTOMATIC START/STOP SYSTEM IN A VEHICLE UTILIZING A FLUID LAUNCH CLUTCH

(71) Applicant: Ford Global Technologies, LLC, Dearborn, MI (US)

(72) Inventors: Hafiz Shafeek Khafagy, Dearborn, MI (US); Siraj Siddiqui, Lasalle (CA); Steven Anatole Frait, Milan, MI (US); Alexander O'Connor Gibson, Ann Arbor, MI (US); Mohannad Hakeem, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/145,329

(22) Filed: May 3, 2016

(65) Prior Publication Data

US 2017/0321767 A1    Nov. 9, 2017

(51) Int. Cl.
*G06F 19/00*    (2011.01)
*F16D 48/06*    (2006.01)

(52) U.S. Cl.
CPC ...... *F16D 48/066* (2013.01); *B60Y 2300/192* (2013.01); *B60Y 2300/45* (2013.01); *F16D 2500/10412* (2013.01); *F16D 2500/3069* (2013.01); *F16D 2500/3108* (2013.01); *F16D 2500/3144* (2013.01); *F16D 2500/31426* (2013.01)

(58) Field of Classification Search
CPC .......... F16D 48/066; F16D 2500/3144; F16D 2500/3108; F16D 2500/3069; F16D 2500/10412; F16D 2500/31426
See application file for complete search history.

(56) References Cited

U.S. PATENT DOCUMENTS

| 6,754,579 B2 | 6/2004 | Kamiya et al. | |
|---|---|---|---|
| 8,204,659 B2 * | 6/2012 | Kouno | B60K 6/48 180/65.28 |
| 2006/0089235 A1 * | 4/2006 | Kobayashi | B60K 6/48 477/107 |

(Continued)

OTHER PUBLICATIONS

Romain Nicolas, posted Jan. 21, 2013, Stop and start system for automatic transmissions, http://www.car-engineer.com/stop-start-system-for-automatic-transmissions. (5 pages).

(Continued)

*Primary Examiner* — David J Hlavka
(74) *Attorney, Agent, or Firm* — David B. Kelley; Brooks Kushman P.C.

(57) ABSTRACT

A system and method for operating a vehicle equipped with an automatic stop and start system is disclosed. The vehicle includes an internal combustion engine, an automatic transmission and a fluid launch device with an impeller disconnect clutch. A controller may initiate an automatic stop or start of the engine under certain operating conditions. During an engine start/stop event, the engine is automatically shut down and the impeller clutch of the fluid launch device may be disengaged to decouple the engine and transmission from the driveline to provide for improved fuel economy and reduced emissions.

7 Claims, 3 Drawing Sheets

(56) References Cited

U.S. PATENT DOCUMENTS

| | | |
|---|---|---|
| 2009/0118886 A1* | 5/2009 | Tamai .................... B60K 6/365 |
| | | 701/22 |
| 2009/0127050 A1 | 5/2009 | Ari et al. |
| 2009/0247362 A1* | 10/2009 | Nedachi ................ F16D 48/066 |
| | | 477/172 |
| 2012/0265427 A1 | 10/2012 | Petridis et al. |
| 2013/0297122 A1 | 11/2013 | Gibson et al. |
| 2014/0290406 A1 | 10/2014 | Hemphill |
| 2015/0259008 A1 | 9/2015 | Seguchi |

OTHER PUBLICATIONS

"https://math.stackexchange.com/questions/1893988/how-should-we-calculate-difference-between-two-numbers", retrieved Sep. 4, 2017, 2 pgs.

* cited by examiner

METHOD FOR OPERATING AN AUTOMATIC START/STOP SYSTEM IN A VEHICLE UTILIZING A FLUID LAUNCH CLUTCH

TECHNICAL FIELD

This disclosure relates to a method and a system for operating an automatic start/stop system in a motor vehicle having an internal combustion engine, a transmission and a fluid launch device with an impeller disconnect clutch.

BACKGROUND

Many automotive vehicles are equipped with an automatic start/stop system, which automatically shuts down and restarts the engine of a vehicle to reduce fuel consumption of the vehicle under certain conditions. In operation, the internal combustion engine can be stopped, i.e. switched off, automatically by the automatic start/stop system if no propulsion is required, for example by idling at a traffic light, and can be restarted if the driver calls for power again.

One type of start/stop system is known as a rolling start/stop. A rolling start/stop system involves stopping the internal combustion engine when the vehicle is moving and decelerating. When power from the engine is required, e.g., the driver releases the brakes, the engine is automatically restarted. The engine may also be automatically started in response to other conditions such as battery state of charge or loads on the electrical system. These engine auto stops may improve fuel economy and reduce emissions by reducing engine idle time and thus fuel consumption for the drive cycle. However, a rolling start/stop in a vehicle with an automatic transmission connected to the drivetrain via a conventional torque converter may result in objectionable noise, vibration, and harshness (NVH) or drivability. One strategy to mitigate these effects is to automatically shift the transmission into neutral, although this requires rapid reengagement when power is demanded and may result in a shift bump that is also objectionable to some occupants.

SUMMARY

A system and method for operating an automatic start/stop system in a motor vehicle having an internal combustion engine, a transmission, and a fluid launch device include operating an impeller disconnect clutch during a rolling auto stop event. Embodiments according to the present disclosure may be implemented in various applications to improve fuel economy.

According to an embodiment of the present disclosure, a vehicle includes an engine, a transmission and a launch device. The launch device may include a disconnect clutch for selectively coupling the engine and the transmission. The vehicle may also include a controller configured to, in response to the engine being stopped when a brake pedal is depressed and a vehicle speed is above a first speed threshold associated with vehicle idle, disengage the disconnect clutch to decouple the engine and the transmission. The controller may further be configured to disengage the disconnect clutch in response to the engine being stopped when the vehicle speed is below a second speed threshold associated with a rolling stop threshold limit.

In another embodiment, a start/stop system for a vehicle having an engine, a transmission and a launch device including a disconnect clutch is disclosed. The start/stop system may include a controller configured to, in response to an engine being alternately stopped and restarted during a rolling auto stop event, control the disconnect clutch of the launch device to selectively couple the engine and the transmission. The controller may further be configured to disengage the disconnect clutch to decouple the engine and the transmission in response to the engine being stopped when a brake pressure is above a pressure threshold and a vehicle speed is above a first speed threshold but below a second speed threshold.

In yet another embodiment, a method for operating an automatic stop and start system in a vehicle having an engine, a transmission and a launch device including a disconnect clutch for selectively coupling the engine and transmission is disclosed. The method may include controlling the launch device to disengage the disconnect clutch to decouple the engine and transmission in response to an automatic stop of the engine when a brake line pressure exceeds a pressure threshold and a vehicle speed exceeds a first speed threshold but is below a second speed threshold. The first speed threshold may be based on a vehicle idle speed and the second speed threshold is based on a rolling stop speed threshold limit. The method may further include controlling the launch device to maintain disengagement of the disconnect clutch when a change in the brake line pressure is below a threshold value.

Embodiments according to the present disclosure may provide a number of advantages. For example, control of an impeller clutch during a rolling stop-start may provide fuel savings and reduced emissions associated with decreased operation of the engine and reduced engine drag during vehicle deceleration. Reduced NVH during engine restart may improve customer satisfaction so that rolling stop-start operating modes may be readily accepted and employed by customers. Disconnecting the engine from the transmission using an impeller clutch may reduce engine, transmission, and connecting component wear. Additionally, use of a fluid launch clutch may provide axial space savings in comparison to a conventional torque converter. The above advantages and other advantages and features will be readily apparent from the following detailed description of the preferred embodiments when taken in combination with the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Vehicles equipped with start/stop systems are powered by conventional internal combustion engines. A controller may initiate an automatic stop or start of the engine under certain operating conditions. For example, the start/stop system may automatically stop the engine when the vehicle is stopped or decelerating and the engine is not required for propulsion or other purposes. At a later time, the start/stop system may restart the engine when required for propulsion or other purposes, e.g., when the brake pedal is released and/or the accelerator pedal is actuated. By disabling the engine when possible, overall fuel consumption is reduced.

One type of start/stop system is known as a rolling start/stop ("RSS"). A RSS system involves stopping the internal combustion engine when the vehicle is moving. In particular, a vehicle equipped with RSS technology is configured to shut down the engine below a defined vehicle speed threshold as the driver applies the brakes. The defined vehicle speed threshold at which a RSS strategy can be implemented is based on the vehicle application. One of the challenges with RSS technology in vehicles equipped with automatic transmissions is that during a RSS event the engine stays rigidly connected to the drivetrain through use of a conventional torque converter. When the engine is automatically stopped after application of the brake or while a vehicle is idling at a traffic light, a conventional torque converter is still pumping fluid but no useful work is being done, reducing the fuel economy. Accordingly, embodiments of the present disclosure provide systems and methods for implementing a RSS strategy in a vehicle with an automatic transmission that improve fuel economy without drivability impact through use of a fluid launch device with an impeller disconnect clutch.

Figure 1:
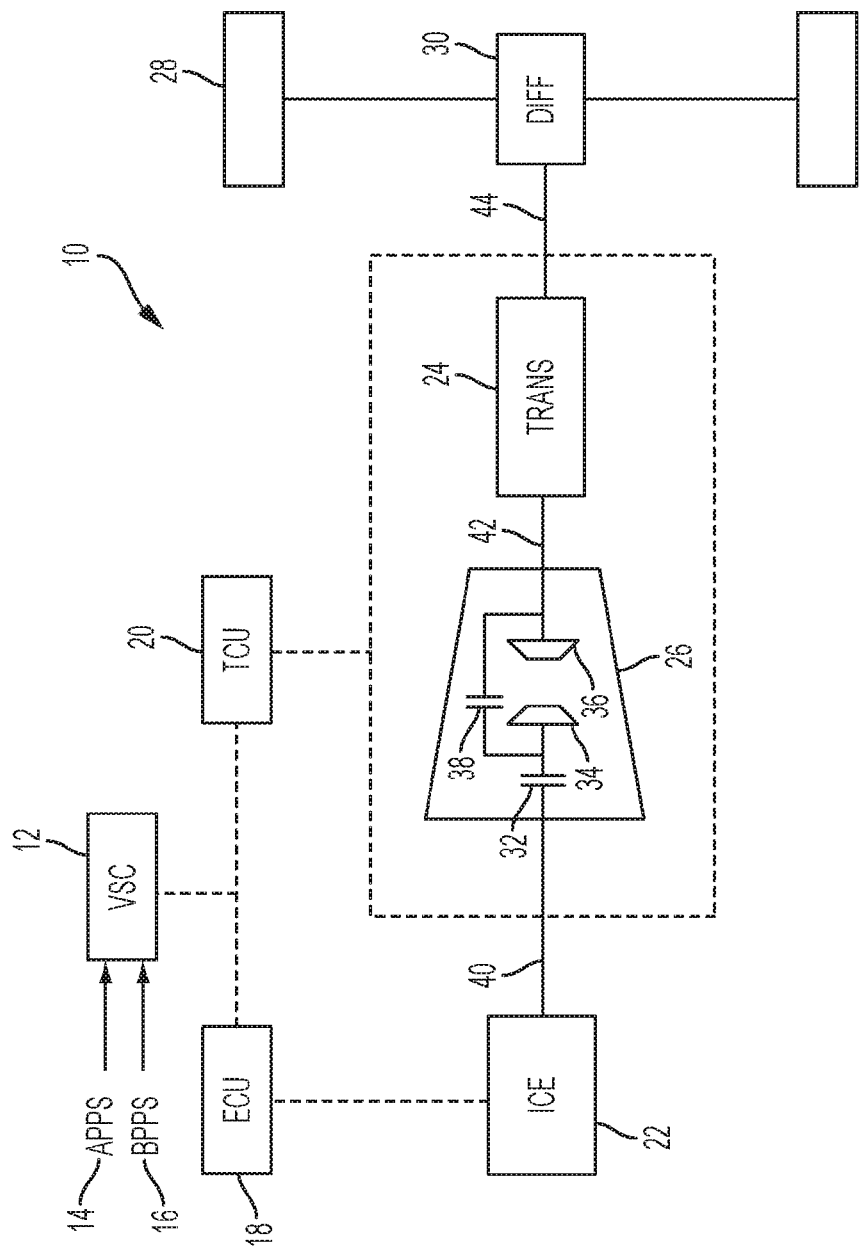
FIG. 1 is a schematic representation of a vehicle powertrain system according to an embodiment of the present disclosure.

Referring to FIG. 1, a schematic diagram of a vehicle powertrain 10 is illustrated according to an embodiment of the present disclosure. FIG. 1 illustrates representative relationships among the components. Physical placement and orientation of the components within the vehicle may vary. The vehicle powertrain 10 includes a vehicle system controller (VSC) 12 that has appropriate logic/controls for implementing an engine start/stop system. The VSC 12 receives signals from an accelerator pedal position sensor (APPS) 14 and a brake pedal position sensor (BPPS) 16 to determine vehicle acceleration and deceleration demands.

The vehicle powertrain 10 includes an engine 22 that drives transmission 24. An engine control unit (ECU) 18 is configured to control the engine 22 and a transmission control unit (TCU) 20 is configured to control operation of the transmission 24 and a fluid launch clutch 26. The VSC 12 transfers data between the TCU 20 and ECU 18 and is also in communication with various vehicle sensors. Engine 22 generates mechanical power by converting stored chemical energy in a fuel source. Transmission 24 adapts the speed and torque of the mechanical power produced by the engine 22 to suit the current needs of the vehicle. Mechanical power from transmission 24 is routed to wheels 28 by differential 30.

The transmission, or gearbox, 24 may include gear sets (not shown) that are selectively placed in different gear ratios by selective engagement of friction elements such as clutches and brakes (not shown) to establish the desired drive ratios. The transmission 24 is automatically shifted from one ratio to another based on various vehicle and ambient operating conditions by an associated controller, such as TCU 20. The transmission, or gearbox, 24 then provides powertrain output torque to output shaft 44.

Fluid launch clutch 26 transmits power and torque from engine crankshaft 40 to transmission input shaft 42 of transmission 24. The fluid launch clutch 26 may include an impeller clutch 32, impeller 34, and turbine 36. The impeller clutch 32 of the fluid launch clutch 26 may be controlled to selectively couple the engine 22 with the impeller 34 and transmission 24. A bypass clutch 38 may also be provided that, when engaged, frictionally or mechanically couples the impeller 34 to the turbine 36 of the fluid launch clutch 26. The bypass or lock-up clutch 38 for the fluid launch clutch 26 may be selectively engaged to create a mechanical connection between the impeller side and the turbine side of the fluid launch clutch 26 for direct torque transfer from engine crankshaft 40 to the transmission input shaft 42.

In general, the control system for the vehicle powertrain 10 may include any number of controllers, such as VSC 12, ECU 18 and TCU 20, and may be integrated into a single controller, or have various modules. Some or all of the controllers may be connected by a controller area network (CAN) or other system. The control system may be configured to control operation of various components of the transmission 24, fluid launch clutch 26 and engine 22 under any of a number different conditions, including an engine start/stop system. The control system, including VSC 12, ECU 18 and TCU 20, may implement an engine start/stop system by, at appropriate times, stopping engine 22 by halting fuel and restarting the engine 22 when propulsion is required.

The control system controls various actuators in response to signals from various sensors to control functions such as starting/stopping engine 22, operating impeller clutch 32 of fluid launch clutch 26 to selectively decouple impeller 34 from the driveline, selecting or scheduling transmission shifts, etc. The control system may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

Figure 2:
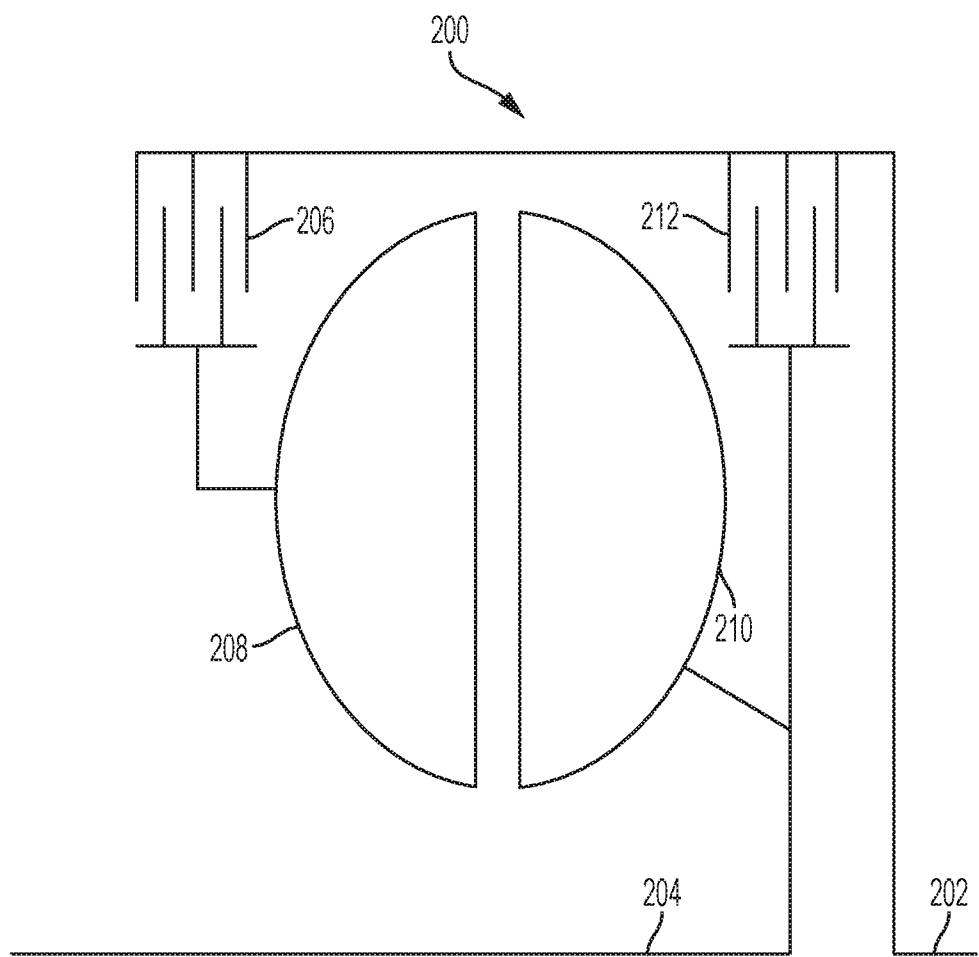
FIG. 2 is a schematic representation of a fluid launch device having an impeller disconnect clutch according to one or more embodiments of the present disclosure.

FIG. 2 schematically illustrates a fluid launch clutch 200 according to one or more embodiments of the present disclosure. The fluid launch clutch is similar to a torque converter without a stator and therefore lacks the ability to multiply engine torque. Because the fluid launch clutch does not have a stator, it provides axial space savings in comparison to a conventional torque converter. The fluid coupling is designed to be engaged only for low speed maneuvers, such as creep and parking lots, and initially during a launch event. The fluid launch clutch has the same ability for impeller disconnect at idle and allowing for impeller slip during a launch for faster time to boost. The method of controlling the impeller and lock-up clutches can be controlled to achieve desired vehicle performance. This is accomplished by controlling the amount of torque on these clutches. Reduced axial space requirements of the fluid launch clutch allows for the potential to add additional gear sets in the transmission, which further increases the ratio spread. With more gear ratio spread, there is less need for torque multiplication, making the fluid launch clutch an improvement for vehicle powertrains.

Fluid launch clutch 200 provides two parallel power flow paths from engine crankshaft 202 to transmission input shaft 204. A hydrodynamic power flow path includes impeller clutch 206, impeller 208, and turbine 210. Impeller 208 is selectively coupled to engine crankshaft 202 by impeller clutch 206. An impeller clutch 206 is an actively controlled friction clutch that selectively couples an impeller 208 of the fluid launch clutch 200 to the engine crankshaft 202. The impeller clutch 206 allows for the engine and the transmission to be decoupled from the driveline during certain vehicle events, such as during a RSS event. Turbine 210 is fixedly coupled to transmission input shaft 204. Engine crankshaft 202 is selectively coupled to transmission input shaft 204 by bypass or lock-up clutch 212 providing a second power flow path.

During a launch condition, pressure within the fluid launch clutch 200 is increased to engage impeller clutch 206, while the bypass clutch 212 remains disengaged. The impeller clutch 206 is engaged to connect impeller 208 to the vehicle engine so that torque received from engine crankshaft 202 is output to transmission input shaft 204 through turbine 210. Impeller 208 directs fluid into the turbine 210 to transmission input shaft 204 to propel the vehicle. After initial launch, pressure within the fluid launch clutch 200 is increased to a sufficient level to engage bypass clutch 212. Engagement of bypass or lock-up clutch 212 bypasses the fluid circuit so that torque is transmitted directly from the engine crankshaft 202 to the transmission input shaft 204. Whereas, during a vehicle stop or RSS event, the impeller clutch 206 and the bypass clutch 212 can be disengaged so the impeller does not rotate and fuel economy can be improved.

Both impeller clutch 206 and bypass clutch 212 are actively controlled friction clutches with torque capacities that respond to changes in fluid pressure in hydraulic circuits. The hydraulic circuits may be dedicated circuits whose only function is to control the clutch. Alternatively, the hydraulic circuits may also be used for other functions such as supplying fluid to the fluid launch clutch torus.

The control logic or functions described above may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used.

Figure 3:
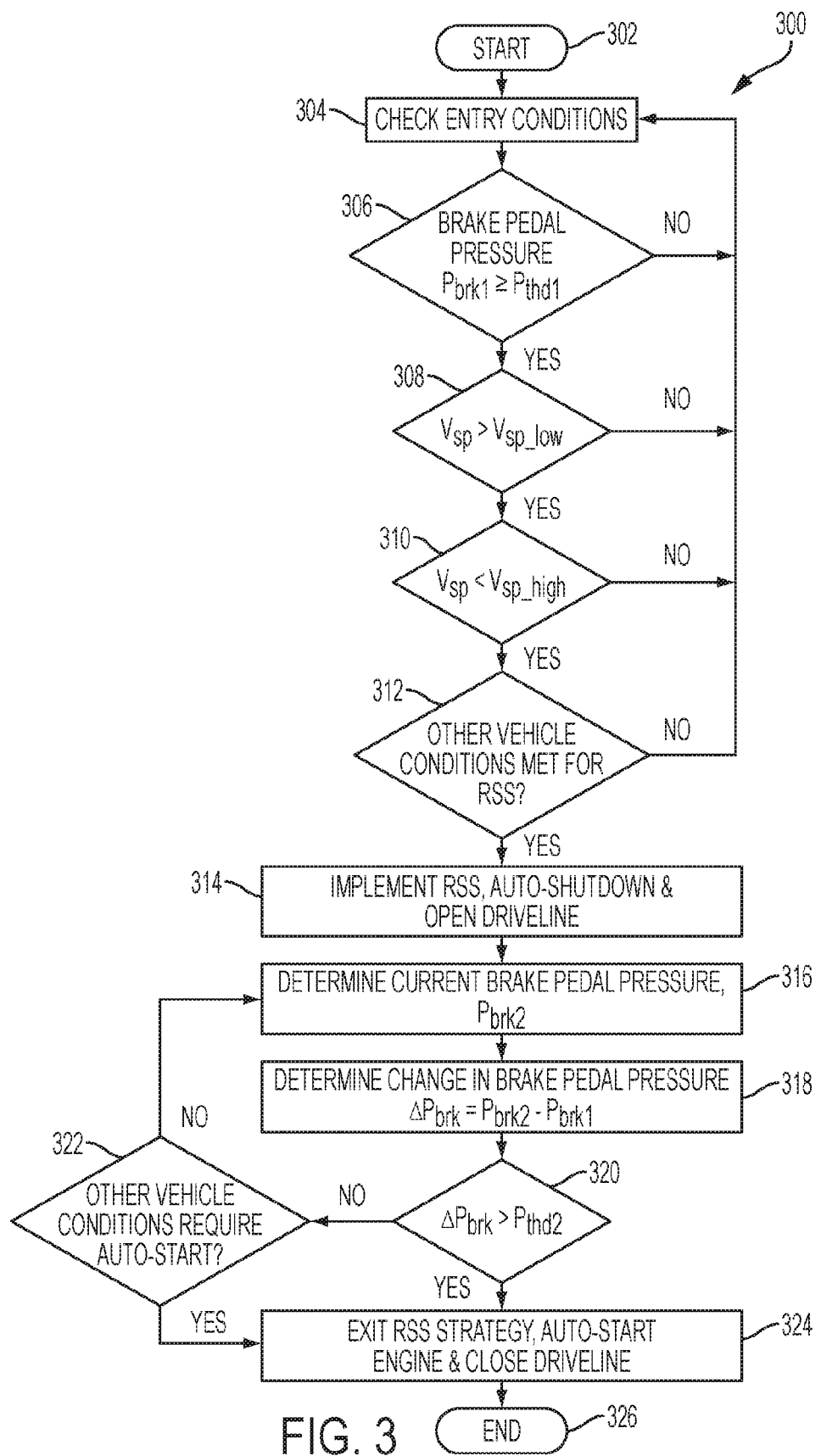
FIG. 3 is a flowchart illustrating a method for operating an engine start/stop system utilizing a fluid launch device with an impeller disconnect clutch according to a representative embodiment of the present disclosure.

Referring to FIG. 3, a control algorithm 300 illustrating a method for operating an engine start/stop system utilizing a fluid launch clutch with an impeller disconnect clutch is described. The control algorithm begins at block 302. A set of entry conditions are then evaluated at blocks 304-312. At decision block 306, a first brake pressure $P_{brk1}$ is compared with a first pressure threshold $P_{thd1}$. The first pressure threshold $P_{thd1}$ is a value associated with a driver's intent to begin a rolling auto stop event. If the first brake pressure $P_{brk1}$ is less than the first pressure threshold $P_{thd1}$ at decision block 306, then the control algorithm returns to the beginning to evaluate the entry conditions again at block 304. If the first brake pressure $P_{brk1}$ greater than or equal to the speed $V_{sp}$ with a low-speed threshold $V_{sp\_low}$ at block 308. The low-speed threshold $V_{sp\_low}$ may be a value associated with vehicle idle speed.

If the vehicle speed $V_{sp}$ is less than the low-speed threshold $V_{sp\_low}$ at decision block 308, then the control algorithm returns to the beginning to evaluate the entry conditions again at block 304. If the vehicle speed $V_{sp}$ is greater than the low-speed threshold $V_{sp\_low}$ at decision block 308, then the control algorithm compares the vehicle speed $V_{sp}$ to a high-speed threshold $V_{sp\_high}$ at block 310. The high-speed threshold $V_{sp\_high}$ is a value associated with a maximum vehicle speed at which a rolling start/stop mode can be executed. If the vehicle speed $V_{sp}$ is greater than the high-speed threshold $V_{sp\_high}$ at block 310, then the control algorithm returns to the beginning to evaluate the entry conditions again at block 304. If the vehicle speed $V_{sp}$ is less than the high-speed threshold $V_{sp\_high}$ at block 310, then the control algorithm evaluates other vehicle conditions to determine whether the engine can be shutdown. Other vehicle conditions may include the battery state of charge, loads on the electrical system, catalyst temperature, etc.

If other vehicle conditions indicate that the engine should not be stopped at this time, then the control algorithm returns to the beginning to evaluate the entry conditions again at block 304. Whereas, if at decision block 312 it is determined after evaluating other vehicle conditions that the engine can be shutdown, then a rolling start/stop ("RSS") strategy is implemented at block 314. During implementation of RSS mode, the engine is automatically shut down and the impeller clutch of the fluid launch clutch is commanded to disengage to decouple the impeller and the engine (i.e., driveline is opened). Then the control algorithm determines a current brake pedal pressure $P_{brk2}$ at block 316 and then calculates a difference $\Delta P_{brk}$ between the current brake pedal pressure $P_{brk2}$ and the first brake pedal pressure $P_{brk1}$ at block 318.

The change or difference $\Delta P_{brk}$ between the current brake pedal pressure $P_{brk2}$ and the first brake pedal pressure $P_{brk1}$ is then compared with a corresponding pressure threshold $P_{thd2}$ at decision block 320. The corresponding pressure threshold $P_{thd2}$ is a value associated with a driver's intent to exit the rolling auto stop event. If the change in brake line pressure $\Delta P_{brk}$ exceeds the corresponding pressure threshold $P_{thd2}$, then this indicates a driver's intent to exit the rolling auto stop event and the control algorithm then exits the RSS strategy at block 324. The engine is then restarted and the driveline is closed i.e., the impeller clutch is engaged to couple the impeller and engine. If the change in brake line pressure $\Delta P_{brk}$ is below the corresponding pressure threshold $P_{thd2}$ at block 320, then this indicates a driver's intent to continue the rolling auto stop event and the control algorithm then evaluates at decision block 322 whether other vehicle conditions require the engine to be restarted.

Other vehicle conditions may include the battery state of charge, loads on the electrical system, catalyst temperature, etc. For example, the controller may determine whether a vehicle power demand exceeds a currently available electrical power, where the vehicle power demand is based on an amount of electrical energy required to power vehicle accessory loads and subsystems. If this is the case, then the engine may need to be restarted to meet the vehicle power demand. Likewise, the controller may determine that the engine should be restarted in response to a battery voltage corresponding to a threshold limit.

If other vehicle conditions require the engine to be restarted at decision block 322, then the control algorithm exits the RSS strategy, restarts the engine and the impeller clutch is engaged to close the driveline to couple the fluid launch clutch impeller with the engine at block 324. If other vehicle conditions do not require the engine to be restarted at decision block 322, then the control algorithm returns to block 316 to keep evaluating the current brake pedal pressure $P_{brk2}$ and any subsequent change in the brake line pressure $\Delta P_{brk}$. The control strategy ends at block 326.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle, comprising:
 an engine;
 a transmission;
 a launch device including a disconnect clutch for selectively coupling the engine and the transmission; and
 a controller configured to, in response to the engine being stopped when a brake pedal is depressed and a vehicle speed is above a first speed threshold associated with vehicle idle, disengage the disconnect clutch to decouple the engine and the transmission.

2. The vehicle of claim 1, wherein the controller is further configured to disengage the disconnect clutch in response to the engine being stopped when the vehicle speed is below a second speed threshold associated with a rolling stop threshold limit.

3. The vehicle of claim 1, wherein the controller is further configured to engage the disconnect clutch in response to the engine being restarted when a change in a brake line pressure exceeds a threshold value.

4. The vehicle of claim 1, wherein the controller is further configured to maintain disengagement of the disconnect clutch when a change in a brake line pressure is less than a threshold value.

5. The vehicle of claim 1, wherein the controller is further configured to engage the disconnect clutch in response to the engine being restarted when a vehicle power demand exceeds a currently available electrical power.

6. The vehicle of claim 5, wherein the vehicle power demand is determined from an amount of electrical energy required to power vehicle subsystems.

7. The vehicle of claim 1, wherein the controller is further configured to engage the disconnect clutch in response to the engine being restarted when an accelerator pedal is actuated.

* * * * *